Figure 1:
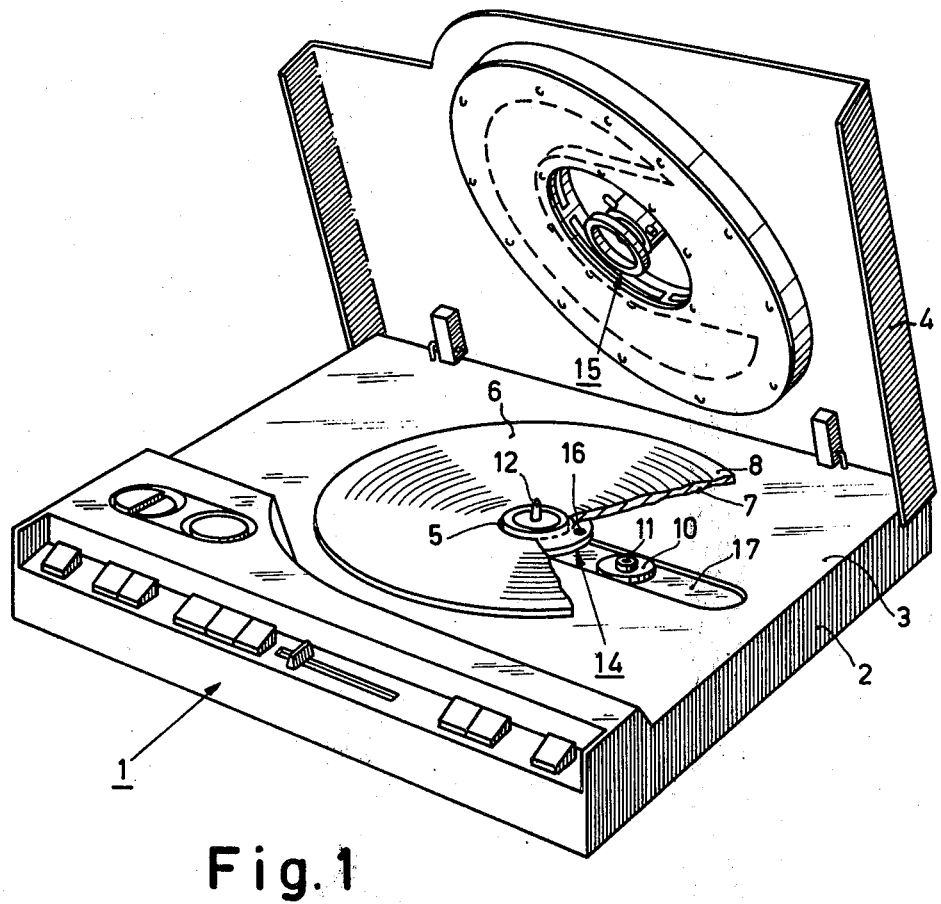

United States Patent [19]

Camerik

[11] 3,977,684

[45] Aug. 31, 1976

[54] PLAYBACK APPARATUS, IN PARTICULAR A VIDEO PLAYER

[75] Inventor: Eduard Camerik, Eindhoven, Netherlands

[73] Assignee: U.S. Philips Corporation, New York, N.Y.

[22] Filed: Oct. 20, 1975

[21] Appl. No.: 624,120

[30] Foreign Application Priority Data

Aug. 28, 1975  Netherlands .................... 7510150

[52] U.S. Cl. .................... 274/5 R; 179/100.3; 274/23 A; 274/41.6 S
[51] Int. Cl.² ........................................ G11B 7/00
[58] Field of Search ............ 274/5 R, 23 A, 41.6 R, 274/41.6 S, 41.6 PP; 179/100.3 V; 360/86, 97

[56] References Cited
UNITED STATES PATENTS

| | | |
|---|---|---|
| 728,867 | 5/1903 | Clay .................................... 274/5 R |
| 2,270,996 | 1/1942 | Dallenbach .......................... 274/5 R |
| 3,839,601 | 10/1974 | Kimura et al. ............... 179/100.3 V |

*Primary Examiner*—Richard E. Aegerter
*Assistant Examiner*—Steven L. Stephan
*Attorney, Agent, or Firm*—Frank R. Trifari; Simon L. Cohen

[57] ABSTRACT

A playback apparatus, in particular a video player, for playing back round disks, which are provided with information tracks which are optically readable with the aid of a read beam obtained from a light source, and having a housing which comprises a substantially flat covering plate and an optical focussing device movable to and fro in a slot in the covering plate. In view of the safety of the apparatus and for other, such as aesthetical, reasons the slot is closed by a closing element in every position of the focussing device, which element is connected to the focussing device and for example consists of a flexible strip of a width greater than the width of the slot.

3 Claims, 2 Drawing Figures

PLAYBACK APPARATUS, IN PARTICULAR A VIDEO PLAYER

The invention relates to a playback apparatus, in particular a video player, for playing back a round disk, which is provided with information tracks which are optically readable with the aid of a read beam obtained from a radiation source, in particular a laser, and comprising: a housing with a substantially flat covering plate in which a slot is formed, a motor-driven drive spindle which projects from the housing for rotating the disk parallel to the covering plate, and an optical focussing device, which is radially movable relative to the drive spindle in the housing and substantially underneath the covering plate, for projecting the read beam onto the information tracks, which focussing device is movable underneath and, as the case may be, partly in the slot.

Such a video player is described in the Applicant's previous U.S. patent application Ser. No. 583,987, filed June 5, 1975, not yet published.

The open connection with the interior of the video player via said slot is a drawback both in view of aesthetical and safety aspects. Furthermore, the correct operation of the playing apparatus may be adversely affected by objects and dust which may penetrate the apparatus through the slot. It is an object of the invention to provide a solution to these problems and the invention is characterized in that in every position of the objective the slot is closed by a closing element which is connected to the objective and which is movable relative to the housing. Since the slot is continuously closed a substantial improvement of the appearance of the playing apparatus is obtained. Moreover, it becomes virtually impossible that radiation can emerge from the machine through the slot, or that objects or dust can penetrate the interior of the video player through the slot.

The space available for mounting a movable closing element is comparatively small. The slot extends from approximately the centre of the drive spindle to an outer wall of the video player housing. In view of this limited space an embodiment of the invention can be used to advantage, which is characterized in that the closing element is disposed underneath the slot and comprises a flexible strip having a width greater than the width of the slot, whilst the strip near the ends of the slot is passed over guide elements which extend transversely to the radial direction of movement of the focussing device and essentially forms a closed or partial loop, the ends of the strip being loaded by resilient means. In this respect the guide elements may advantageously consist of rollers which are journalled in supports which are connected to the deck.

Figure 2:
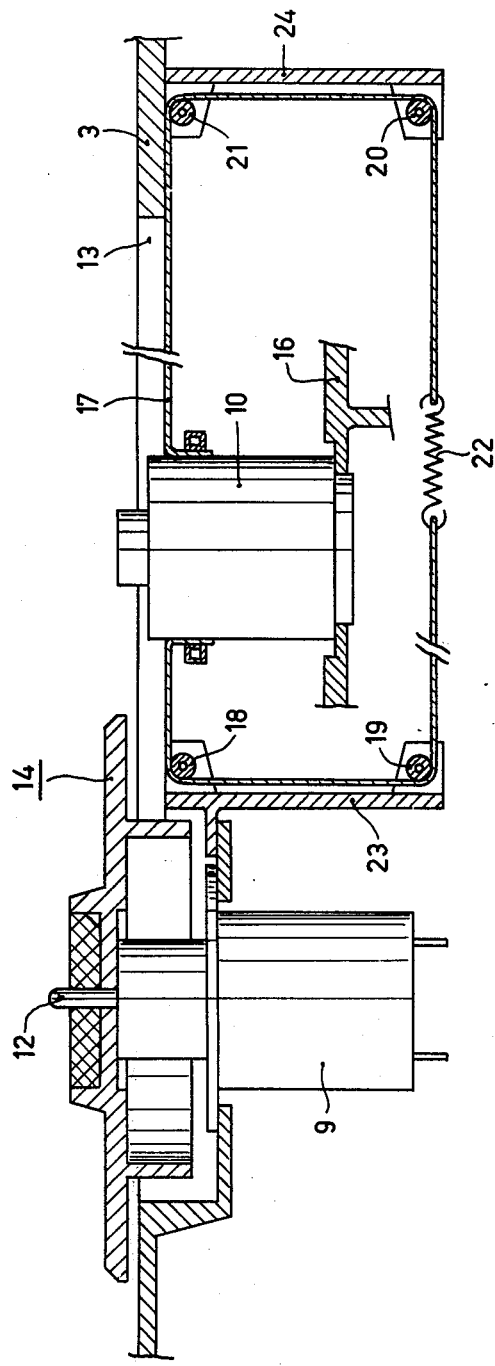

The invention will now be described in more detail with reference to an embodiment shown in the drawing, in which FIG. 1 is a perspective view of a video player, which is shown with opened cover, a video disk, which for clarity is partly cut away, being disposed on the spindle, and FIG. 2 shows a cross-section of a part of the video player of FIG. 1 in accordance with a plane which passes through the central line of the drive spindle and which extends in the longitudinal direction of the slot.

The playing apparatus 1 of FIG. 1 comprises a housing 2 with a substantially flat covering plate 3 and a cover 4 which is hingedly connected to the housing 2. The player serves for playing back round video disks 6 which are provided with a central hole 5 and are made of a transparent material. At one side these disks have a transparent surface 7, which when the disk is disposed on the video player faces the covering plate. At its other side the disk has a surface 8 on which the information is contained in the form of local recesses and/or elevations, as well as a light reflecting layer. Said layer is too thin to be shown in the drawing. With the aid of a light source, not shown, a read beam can be projected onto the surface 8 through the transparent surface 7 via a focussing device 10 with an objective 11 and the reflected beam be returned through the objective to the information detection means which are located in the housing. A motor-driven drive spindle 12 projects from the housing 2 for rotating the video disk 6 parallel to the covering plate. The motor which is used for this purpose bears the reference numeral 9 in FIG. 2. The optical focussing device 10 is radially movable in the housing relative to the drive spindle in a slot 13. Said focussing device is adapted to co-operate with a rigid video disk having a thickness of approximately 1.1 mm.

A disk clamping device mounted on the drive spindle comprises a disk support 14 which cooperates with a rigid disk near the central hole 5 outside the range of the information tracks. This clamping device, in addition to the disk support 14, also includes a resiliently-loaded disk loading means 15 which cooperates with the disk near the central hole and is the subject of the Applicant's previous U.S. patent application Ser. No. 583,988, filed June 5, 1975. This previous Application is included herein by means of reference and the disk clamping device described therein will not further be discussed herein. It is to be noted only that the disk support 14 comprises three disk carrying members 16, one of which is visible in FIG. 1, and which exert a sufficiently high friction torque on the video disk 6 to drive said disk in the correct manner. Furthermore, it is to be noted that the disk loading means 15 cooperates with permanent magnetic means in the disk support 14 so as to retain the video disk tightly.

The optical focussing device 10 is mounted on a carriage, which can be moved to and fro at the underside of the covering plate 3 in the direction of the slot. The part of the slide which is visible in FIG. 2 bears the reference numeral 16. Further details about the carriage 16 are not necessary for a correct understanding of the invention. In this respect it is to be noted only that the carriage, in addition to the focussing device 10 carries still further components which belong to the optical system, as well as the laser source used for producing the required light beam. In every position of the focussing device 10 the slot 13 is closed by a closing element 17 which is connected thereto and which is movable relative to the housing 2. Said element consists of a flexible strip of a width greater than the width of the slot 13 which strip is disposed underneath the slot 13, whilst the strip near the end of the slot is passed over guide elements 18, 19, 20 and 21, which extend transversely to the radial direction of movement of the focussing device, and which forms a substantially closed loop, two tension springs 22, of which only one spring is shown in FIG. 2, loading the ends of the strip 17 towards each other. The guide elements consist of rollers which are journalled in two supports 23 and 24 which are connected to the deck. These supports are secured to the underside of the covering plate 3 in a suitable manner which is obvious to those skilled in the art for instance by screwing, whilst the rollers 18 through 21 are journalled in the supports 23 and 24 in a manner which is also obvious to those skilled in the art.

The invention allows many modifications within the scope of the claims. In particular in view of the low rigidity of the flexible strip 17 an embodiment, not shown, may be of importance, in which the strip 17 is provided with rigid portions which extend transversely to the direction of the slot, so that the strip rather obtains the character of a roller shutter, with a low resistance to coiling, but an, as the case may be substantially, higher resistance to flexure in the transverse direction.

What is claimed is:

1. A playback apparatus, in particular a video player (1), for playing back a round disk (6), which is provided with information tracks which are optically readable with the aid of a read beam obtained from a radiation source, in particular a laser, and comprising
   a housing (2) with a substantially flat covering plate (3) in which a slot (13) is formed,
   a motor-driven drive spindle (12) which projects from the housing for rotating the disk (6) parallel to and above the covering plate (3),
   an optical focussing device (10), which is radially movable relative to the drive spindle in the housing and substantially underneath the covering plate (3), for projecting the read beam onto the information tracks, which focussing device (10) is movable substantially underneath the slot (13), and also including a closing element which closes the slot in every position of the focussing device said closing element (17) being connected to the focussing device and movable therewith relative to the housing (2).

2. A playback apparatus as claimed in claim 1, characterized in that the closing element (17) is disposed underneath the slot and comprises a flexible strip having a width greater than the width of the slot, whilst the strip near the ends of the slot is passed over guide elements (18–21) which extend transversely to the radial direction of movement of the focussing device and which substantially forms a loop, the ends of the strip being loaded by resilient means.

3. A playback apparatus as claimed in claim 2, characterized in that the guide elements (18–21) consist of rollers journalled in supports which are connected to the deck.

* * * * *